United States Patent
Borsoi et al.

(10) Patent No.: US 9,468,077 B2
(45) Date of Patent: Oct. 11, 2016

(54) LIGHTING SYSTEM AND METHOD FOR OPERATING A LIGHTING SYSTEM USING POWER CONSUMPTION FOR INFORMATION TRANSMISSION

(71) Applicant: Tridonic GmbH & Co KG, Dornbirn (AT)

(72) Inventors: Giulio Borsoi, Dornbirn (AT); Abhinav Somaraju, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 14/662,900

(22) Filed: Mar. 19, 2015

(65) Prior Publication Data
US 2015/0282281 A1    Oct. 1, 2015

(30) Foreign Application Priority Data

Mar. 25, 2014 (EP) ..................................... 14161501

(51) Int. Cl.
| | | |
|---|---|---|
| *H05B 37/02* | (2006.01) | |
| *H04L 27/04* | (2006.01) | |
| *H04L 27/12* | (2006.01) | |
| *H04L 27/20* | (2006.01) | |

(52) U.S. Cl.
CPC ........... *H05B 37/0272* (2013.01); *H04L 27/04* (2013.01); *H04L 27/12* (2013.01); *H04L 27/2003* (2013.01); *H05B 37/0263* (2013.01)

(58) Field of Classification Search
CPC ..... H05B 37/00; H05B 37/02; H05B 37/034
USPC ....... 315/149, 152, 158, 297, 307, 308, 312, 315/360
See application file for complete search history.

(56) References Cited

U.S. PATENT DOCUMENTS

| | | | | |
|---|---|---|---|---|
| 4,593,232 A | * | 6/1986 | McEdwards | H05B 39/09 315/199 |
| 5,825,135 A | * | 10/1998 | Chang | H05B 37/0254 315/291 |
| 6,490,512 B1 | | 12/2002 | Niggemann | |
| 8,441,215 B1 | * | 5/2013 | Howell | H05B 41/38 315/291 |
| 8,492,983 B1 | * | 7/2013 | Berg | H05B 33/0842 315/185 R |
| 2013/0076339 A1 | | 3/2013 | Veronesi et al. | |
| 2013/0134891 A1 | * | 5/2013 | Woytowitz | H05B 37/02 315/201 |
| 2013/0154518 A1 | | 6/2013 | Davies | |
| 2014/0184066 A1 | * | 7/2014 | Teramoto | H05B 37/02 315/77 |
| 2015/0084547 A1 | * | 3/2015 | Yeh | H04L 12/2807 315/312 |
| 2015/0351183 A1 | * | 12/2015 | Lekatas | H05B 33/0809 315/307 |

FOREIGN PATENT DOCUMENTS

| | | |
|---|---|---|
| DE | 102004002027 A1 | 8/2005 |
| EP | 1000806 A2 | 5/2000 |
| EP | 1555858 A2 | 7/2005 |
| EP | 2203032 A2 | 6/2010 |
| WO | 2008001274 A2 | 1/2008 |

* cited by examiner

*Primary Examiner* — Tung X Le
(74) *Attorney, Agent, or Firm* — Volpe and Koenig, P.C.

(57) ABSTRACT

A lighting control system includes a master unit and a plurality of slave units. The slave units are respectively designed to consume power by operating lighting means, are supplied by a common power supply unit, can be provided with commands from the master unit, and are respectively provided with a control unit which modulates the power consumption of the associated slave unit according to a defined protocol. The master unit is designed to measure the power consumed by all slave units.

14 Claims, 3 Drawing Sheets

LIGHTING SYSTEM AND METHOD FOR OPERATING A LIGHTING SYSTEM USING POWER CONSUMPTION FOR INFORMATION TRANSMISSION

INCORPORATION BY REFERENCE

The present application claims benefit of European Patent Application No. 14161501.3, filed Mar. 25, 2014, the entire contents of which are incorporated by reference herein as if fully set forth.

FIELD OF THE INVENTION

The present invention relates to a lighting system and to a method for operating a lighting system, in which a power consumption is used as a communication channel.

BACKGROUND

In lighting systems, usually a master unit controls the operation of attached slave units, for example lamps. A connection between the master unit and the slave units usually uses a directed wired connection, or a bus connection, for example DALI, or even a wireless connection. Implementing a full bidirectional communication between the master unit and the individual slave units requires a receiver and a transmitter on both ends. This results in a complex hardware of the individual components and thereby a high manufacturing cost. A solution to this problem is to reduce the communication to a unidirectional communication from the master unit to the slave units. In this case though, a feedback from the slave units to the master unit is not possible. The master unit has no way of knowing if a command has reached its destination and was implemented.

The German patent application DE 10 2004 002 027 A1 shows a lighting system, in which a master unit provides power to a number of slave units using a DC output circuit. The state of the DC output circuit is monitored. The slave units are able to deliberately change the state of the DC output circuit in order to transmit feedback information to the master unit.

The system shown there though is disadvantages, since the slave units require a communication unit able to affect the state changes of the DC output circuit. In comparison to a full bidirectional communication between the master unit and the slave units, this solution does not significantly reduce the hardware complexity.

SUMMARY

Accordingly, the object of the invention is to provide a lighting system and a method for operating a lighting system, which allow for a transmission of commands to the slave units and a feedback from the slave units without requiring a complex hardware setup.

The object is solved by the features of claim 1 for the system and claim 10 for the method. The dependent claims contain further developments.

An inventive lighting control system comprises a master unit and a plurality of slave units. The slave units are respectively designed to consume power by operating lighting means, are supplied by a common power supply unit, can be provided with commands from the master unit, and are respectively provided with a control unit which modulates the power consumption of the associated slave unit according to a defined protocol. The master unit is designed to measure the power consumed by all slave units. It is thereby possible to achieve an information feedback from the slave units to the master unit without requiring any additional communication hardware.

Advantageously, the slave units are adapted to transmit a signal to the master unit by modulating the power consumption. The master unit is then adapted to recreate the signal from the measured power consumption of all slave units. It is therefore possible to create an information flow from the slave unit to the master unit.

Advantageously, the master unit and the slave unit comprise a communication unit. The communication unit of the master unit is then adapted to unidirectionally transmit commands to the communication unit of the slave unit. The control unit of the slave unit is then adapted to unidirectionally receive commands from the communication unit of the master unit using the communication unit of the slave unit. It is thereby possible to transmit the commands from the master unit to the slave unit.

Also advantageously, the communication unit of the master unit is connected to the control unit of the slave unit using a direct wired connection and/or a bus connection and/or a wireless connection. The control unit of the master unit is then adapted to transmit the commands to the control unit of the slave unit using the direct wired connection and/or the bus connection and/or the wireless connection. A high flexibility in setting up the communication system is thereby achieved.

The control unit of the master unit is advantageously adapted to query the control unit of the slave unit using the communication unit of the master unit and the communication unit of the slave unit. In this case, the control unit of the slave unit is adapted to answer queries of the control unit of the master by modulating the power consumption. A two-way communication is thereby possible.

Advantageously, the system comprises an address assigning unit adapted to assign addresses to all slave units connected to the master unit. The control unit of the master unit is then adapted to transmit commands to the control unit of the slave unit and to the control unit of the further slave unit using addresses assigned to the slave unit and the further slave unit. The communication units of the slave units are adapted to detect commands targeted at their respective slave unit. The control units of the slave units are adapted to only process commands targeted at their respective slave unit. It is thereby possible to achieve a communication from the master unit only to select slave units.

Advantageously, the control unit of the master unit is adapted to transmit a command to all connected slave units using the communication unit of the master unit instructing all connected slave units to increase or decrease the respective power consumption by a defined amount. The control units of all connected slave units are then adapted to increase or decrease the power consumption of their respective slave unit as instructed. The control unit of the master unit is in this case adapted to determine a number of connected slave units from a resulting change in total power consumption of all connected slave units. Thereby, it is very easily possible to determine the number of connected slave units.

The control units of the slave units are advantageously adapted to modulate the power consumption using an amplitude-shift keying, especially an on-off keying or a phase-shift keying or a frequency-shift keying, and/or using a modulation frequency below 10 Hz, preferably below 5 Hz, most preferably below 1 Hz. Thereby a greater flexibility in performing the modulation is achieved.

Advantageously, the control unit of the master unit is furthermore adapted to detect when the slave units are not in operation and to activate at least one slave unit, after it was detected that the respective slave unit is not in operation. It is then furthermore adapted to instruct the respective slave unit to modulate the power consumption after the slave unit has been activated and to deactivate the slave unit after the power consumption has been modulated. It is thereby possible to transmit the information from the slave unit to the master unit during times at which the slave unit is not used. For example, the lights in an office building can be switched on and off at night in order to generate the feedback signal. This does not hinder usual office processes, since the office is not occupied during these times.

An inventive method serves the purpose of operating a lighting system comprising a master unit and a plurality of slave units. The slave units consume power by operating lighting means, are supplied by a common power supply unit, can be provided with commands from the master unit, and modulate the power consumption of the associated slave unit according to a defined protocol. The master unit measures the power consumed by all slave units. It is thereby possible to achieve a communication path from the slave unit to the control unit without requiring a complex communication infrastructure.

BRIEF DESCRIPTION OF THE DRAWINGS

An exemplary embodiment of the invention is now further explained with respect to the drawings, in which.

DETAILED DESCRIPTION OF THE PREFERRED EMBODIMENTS

Figure 1:
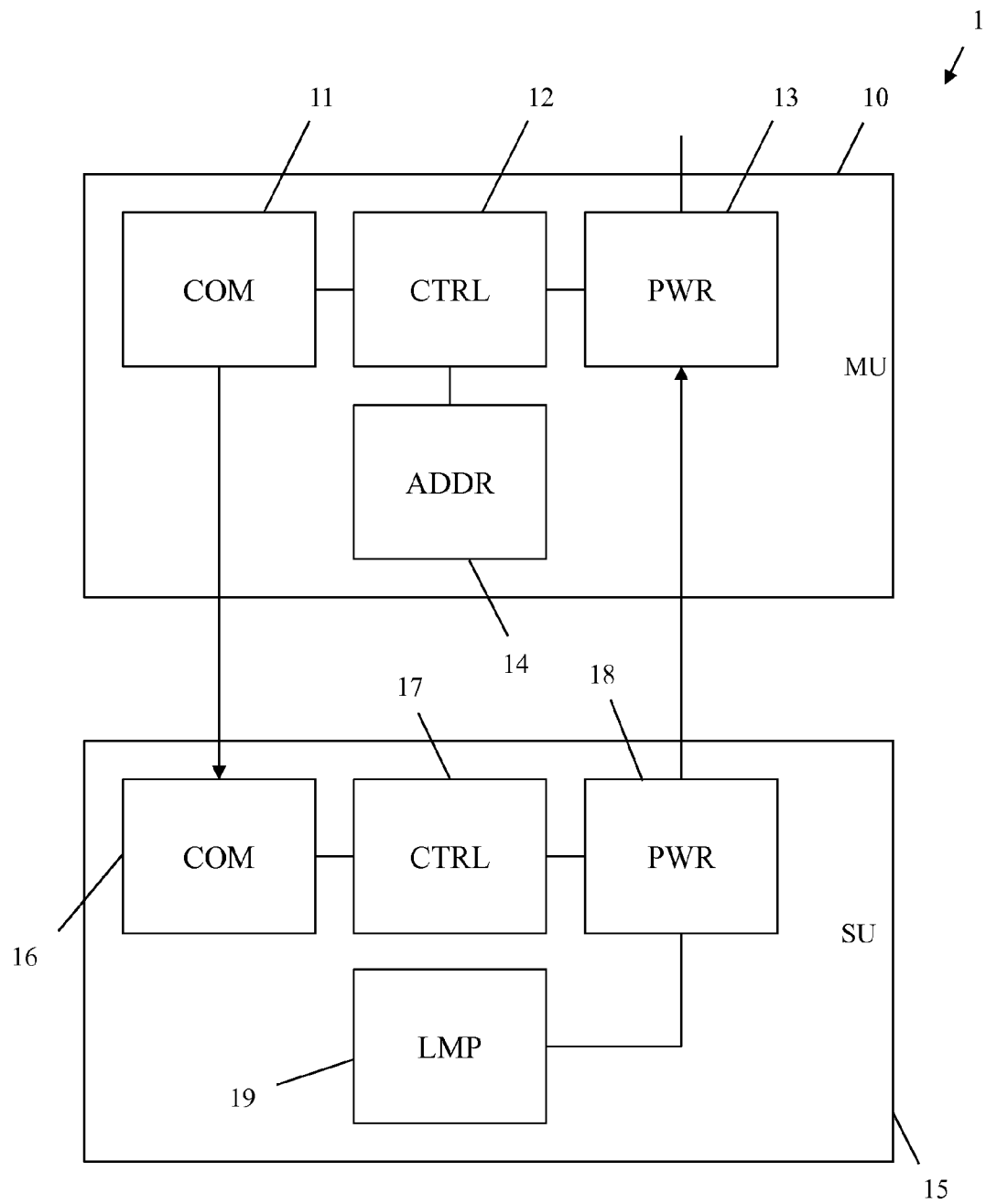
FIG. 1 shows a first exemplary embodiment of the inventive lighting system.

First we demonstrate the general construction and function of an embodiment of the inventive lighting system along FIG. 1. After that, different alternatives of construction are described along FIG. 2 and FIG. 3. Lastly, the function of an embodiment of the inventive method is described regarding FIG. 4. Similar entities and reference numbers in different figures have been partially omitted.

In FIG. 1, a lighting system 1 is depicted. The lighting system 1 comprises a master unit 10, which comprises a communication unit 11 connected to a control unit 12, which is furthermore connected to a power supply unit 13 and an address assigning unit 14. Moreover, the lighting system 1 comprises a slave unit 15, which comprises a communication unit 16, a control unit 17, a power supply unit 18 and a lamp 19. The control unit 17 is connected to the communication unit 16 and to the power supply unit 18. The lamp 19 is connected to the power supply unit 18. The communication unit 11 of the master unit 10 is connected to the communication unit 16 of the slave unit 15. The power supply unit 13 of the master unit 10 is connected to the power supply unit 18 of the slave unit 15. The power supply unit 13 of the master unit 10 furthermore comprises a mains connection.

The power supply unit 13 of the master unit 10 is supplied with power through its mains connections. The power supply unit 13 processes the mains power, for example performs a transformation to a lower voltage level and a rectification and supplies the remaining components of the master unit 10 with power. Also, the power supply unit 13 supplies power to the power supply unit 18 of the slave unit 15. The arrow connecting the power supply unit 13 and the power supply unit 18 merely indicates the direction of information flow and not the direction of power flow.

The control unit 12 of the master unit 10 is adapted to control the function of the communication unit 11, the power supply unit 13 and the address assigning unit 14 of the master unit 10. Especially, the control unit 12 is set up for generating commands, which are transmitted to the slave unit 15 by use of the communication unit 11 of the master unit 10 and the communication unit 16 of the slave unit 15. These commands are received by the control unit 17 of the slave unit 15 from the communication unit 16 of the slave unit 15. The commands are processed by the control unit 17. For example in reaction to such a command, the lamp 19, which is a power consuming unit is activated or deactivated or dimmed. Also, the control unit 17 is adapted to generate a signal for transmitting information to the master unit 10. The signal is handed on to the power supply unit 18, which modulates the power consumption of the slave unit 15 according to the signal. In this example, this can for example be achieved by the power supply unit 18 increasing or decreasing the brightness setting of the lamp 19 or switching the lamp 19 on and off in order to increase or decrease the power consumption of the slave unit 15.

The modulation is performed according a protocol. Due to the use of this protocol, it is possible to achieve a communication using this channel. The protocol can be a standard communication protocol or a proprietary protocol.

Especially, the modulation of the power consumption can be an amplitude-shift keying, especially an off-on keying or a phase-shift keying or a frequency-shift keying. Since the power consumption of the slave unit 15 is modulated by the power supply unit 18, which is a conventional power supply unit and not set up for performing high speed modulation, the modulation frequency is advantageously below 10 Hz, preferably below 5 Hz, most preferably below 1 Hz. This results in a very low data rate of the signal, which can be transmitted from the slave unit 15 to the master unit 10. On the other hand, this allows for a signal transmission without any additional complex hardware.

It is important to note the difference of the modulation of the power consumption according to the present invention to a power line communication. In conventional power line communication systems, a high frequency signal is superimposed onto the power supplying lines. The signal can then be received by all slave units connected to these power supplying lines. The modulated power consumption according to the present invention can only be measured by the master unit 10, which supplies the power to the slave unit 15. Also an important difference is that a regular power line communication system does not modulate the power consumption in a low frequency manner as the present invention, but modulates a superimposed voltage with a very high modulation frequency. A power line communication system does not change the power consumption of the respective slave unit at all.

The connection between the communication unit 11 of the master unit 10 and the communication unit 16 of the slave unit 15 can be a direct wired connection or a bus connection, for example a DALI bus or a wireless connection. The connection between the power supply unit 13 of the master unit 10 and the power supply unit 18 of the slave unit 15 is a wired connection.

The control unit 12 of the master unit 10 can furthermore be set up for determining times at which the slave unit 15 is usually not in operation. Alternatively, the control unit 17 of the slave unit 15 could inform the control unit 12 of the master unit 10, when the slave unit 15 is presently not used. These times are ideal for performing the transmission from the slave unit 15 to the control unit 10, since for modulating the power consumption of the slave unit 15, it might be necessary to compromise the regular function of the slave unit 15, in this case, the function of the lamp 19.

Figure 2:
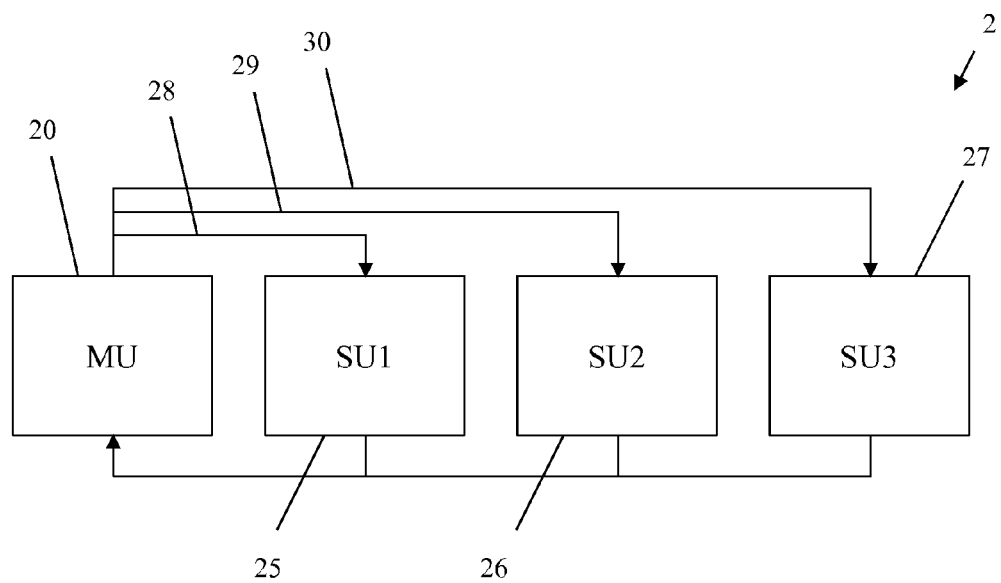
FIG. 2 shows a second exemplary embodiment of the inventive lighting system.

In FIG. 2, a second embodiment of the inventive lighting system 2 is shown. The lighting system 2 comprises a master unit 20, a first slave unit 25, a second slave unit 26 and a third slave unit 27. The master unit 20 is connected to the slave units 25-27 through individual wired connections, 28, 29, 30. These connections are used for connecting the communication unit of the master unit 20 to the communication units of the slave units 25-27. Moreover, the master unit 20 is connected to the slave units 25-27 through a wired connection connecting the power supply unit of the master unit to the power supply units of the slave units 25-27.

Figure 3:
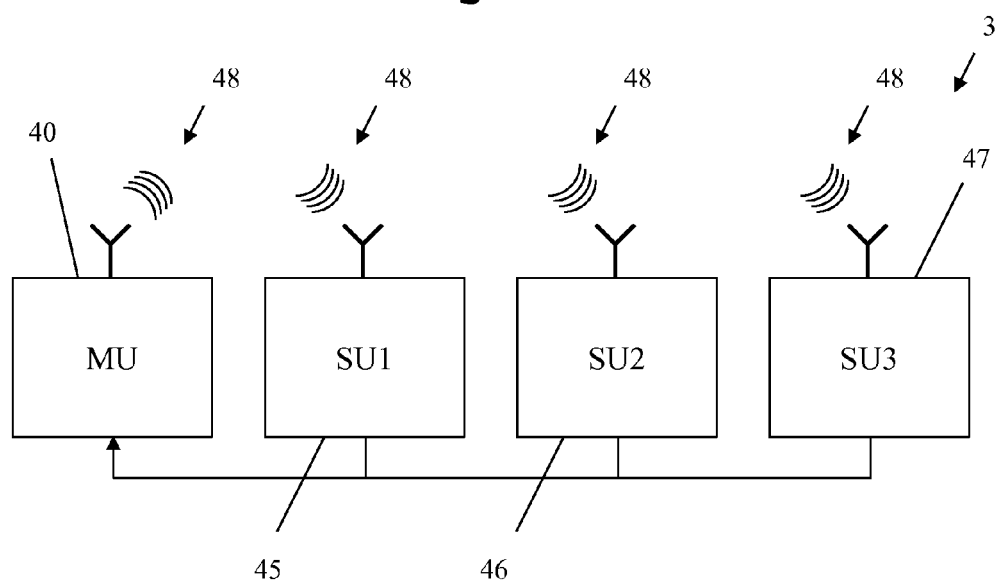
FIG. 3 shows a third exemplary embodiment of the inventive lighting system.

In FIG. 3, a third exemplary embodiment of the inventive lighting system 3 is shown. A wireless connection 48 connects a master unit 40 to slave units 45, 46 and 47. The wireless connection 48 is used for connecting the communication units of the central controlled unit 40 and the slave units 45-47. Also here, the master unit 40 is connected to the slave units 45-47 through a wired connection, connecting the power supply units of the master unit and the slave units 45-47.

In case of more than one slave unit, as depicted in FIG. 2 and FIG. 3, the master unit 20, 40 can broadcast commands to all slave units 25-27, 45-47. The signals broadcast by the central units 20, 40 are received by the slave units 25, 27, 45-47. The slave units 25-27, 45-47 can then each modulate the respective power consumption in order to generate a signal for transmission to the respective control unit 20, 40.

If the lighting system comprises and address assigning unit 14, as depicted in FIG. 1, the master unit 10 can individually target commands at slave units. In this case, the command comprises the respective address. Only the targeted slave unit processes the respective command and reacts thereupon.

The address assigning unit 14 of FIG. 1 is, furthermore, adapted to assign addresses to individual slave units. For example, the master unit 10 transmits an address assigning request to all connected slave units. Through a user input or an automatic process, an individual slave unit is selected and supplied with an address by the address assigning unit 14. This process is repeated for all connected slave units until each slave unit has been assigned an address.

To prepare the address assigning, the master unit 10 of FIG. 1 can, furthermore, determine how many slave units are connected by broadcasting a command to all slave units instructing the slave units to increase or decrease the respective power consumption by a finite amount. From the resulting change in power consumption, the master unit can determine the number of connected slave units.

Figure 4:
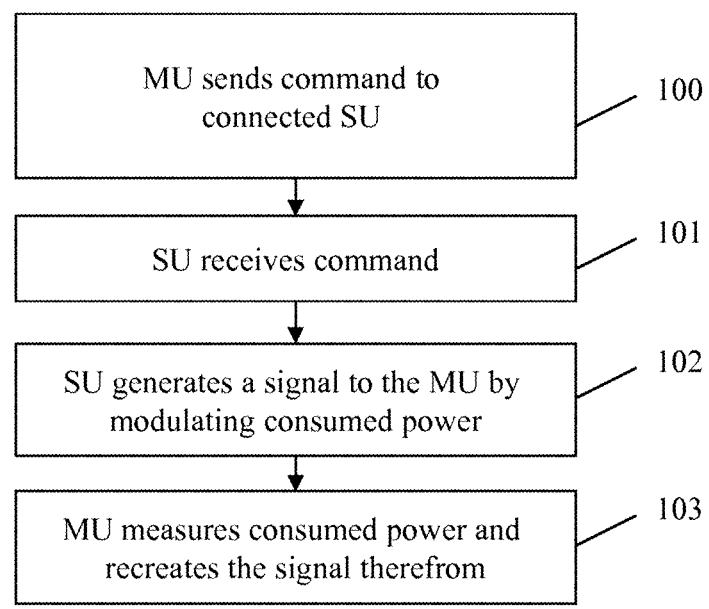
FIG. 4 shows an exemplary embodiment of the inventive method.

In FIG. 4 an embodiment of the inventive method is shown. In a first step 100, a master unit of a lighting system creates and transmits a command to a slave unit of the lighting system. In a second step 101, the slave unit receives the command. In a third step, the slave unit generates a response signal by modulating the power consumed by the slave unit. In a fourth step, this modulated power consumption is detected by the master unit. The signal is recreated therefrom by the master unit.

The lighting system 2 shown in FIG. 2 can also be extended. As already described above it is possible that master unit 20 can measure the combined power consumption of slave unit 25, slave unit 26 and slave unit 27.

In another embodiment of the invention it can be also be possible for slave unit 25 to measure the power consumption of slave unit 26 and slave unit 27 which are connected to the slave unit 25. This means that a device can measure the power of devices connected "behind" such device (seen from the view of the master unit 20). For example slave unit 26 would be able to measure the power consumption of slave unit 27. With such arrangement it would be possible to send messages from slave unit 27 to slave unit 26 and slave unit 25 and to send messages from slave unit 26 to slave unit 25.

One of the advantages of such system is that the network topology of slave units depends on the physical location of the slave unit itself. Such system could offer an automatic address assignment that is based on physical location of the slave units within the lighting system 2.

The slave unit 25 and slave unit 26 could comprise a measurement unit to measure the power consumption of slave units connected to those slave units.

The invention is not limited to the examples shown above. Especially, the invention can be used for communication between a master unit and a great number of different slave units. The slave units can be, for example, lamps, sensors, actors, etc. The characteristics of the exemplary embodiments can be used in any advantageous combination.

The invention claimed is:

1. A lighting system comprising:
a master unit,
a plurality of slave units,
wherein the slave units
are respectively configured to consume power by operating lamps,
are supplied by a common power supply unit,
are provided with commands from the master unit,
are respectively provided with a control unit which modulates the power consumption of the associated slave unit according to a defined protocol, and wherein the master unit is configured to measure the power consumed by all slave units and wherein the slave units are adapted to transmit a signal to the master unit by modulating the power consumption, and wherein the master unit is adapted to recreate the signal from the measured power consumption of all slave units.

2. The lighting system according to claim 1, wherein the system comprises an address assigning unit adapted to assign addresses to all slave units connected to the master unit,
wherein the master unit is adapted to transmit commands to the slave units using addresses assigned to the slave units, and
wherein the slave units are adapted to detect commands targeted at them, and
wherein the slave units are adapted to only process commands targeted at the respective slave unit.

3. The lighting system according to claim 1, wherein the master unit is adapted to transmit a command to all connected slave units instructing all connected slave units to increase or decrease their respective power consumption by a defined amount, wherein that control units of all connected slave units are adapted to increase or decrease the power consumption of their respective slave unit as instructed, and wherein the master unit is adapted to determine a number of connected slave units from a resulting change in total power consumption of all connected slave units.

4. The lighting system according to claim 1, wherein the control units of the slave units are adapted to modulate the power consumption
- using an amplitude-shift keying, especially an on-off keying or a phase-shift keying or a frequency-shift keying, and/or
- using a modulation frequency of: below 10 Hz, below 5 Hz, or below 1 Hz.

5. The lighting system according to claim 1, wherein master unit is adapted to
- detect when the slave units are not in operation, to
- activate at least one slave unit, after it was detected that the respective at least one slave units is not in operation, to
- instruct the at least one slave unit to modulate its power consumption after the at least one slave unit has been activated, and to
- deactivate the at least one slave unit after power consumption has been modulated.

6. A lighting system comprising:
a master unit,
a plurality of slave units,
wherein the slave units
- are respectively configured to consume power by operating lamps,
- are supplied by a common power supply unit,
- are provided with commands from the master unit,
- are respectively provided with a control unit which modulates the power consumption of the associated slave unit according to a defined protocol, the master unit is configured to measure the power consumed by all slave units, and wherein the slave units each comprise a communication unit, wherein the master unit comprises a communication unit, wherein the master unit comprises a control unit adapted to provide the commands and unidirectionally transmit the commands to the communication unit of the respective slave unit using the communication unit of the master unit, and wherein the control units of the slave units are adapted to unidirectionally receive the commands from the communication unit of the master unit using the communication unit of the respective slave unit.

7. The lighting system according to claim 6, wherein the communication unit of the master unit is connected to the communication unit of the slave unit using a direct wired connection and/or bus connection and/or a wireless connection, and wherein the control unit of the master unit is adapted to transmit the commands to the control unit of the slave unit using the direct wired connection and/or the bus connection and/or the wireless connection.

8. The lighting system according to claim 6, wherein the control unit of the master unit is adapted to query the control unit of the slave unit using the communication unit of the master unit and the communication unit of the slave unit, and that the control unit of the slave unit is adapted to answer queries of the control unit of the master unit by modulating the power consumption of the respective slave unit.

9. A method for operating a lighting system comprising a master unit and a plurality of slave units,
wherein the slave units
- consume power by operating lamps,
- are supplied by a common power supply unit,
- are provided with commands from the master unit, and
- modulate the power consumption of the associated slave unit according to a defined protocol, wherein the master unit measures the power consumed by all slave units,
- transmit a signal to the master unit by modulating the power consumption, and wherein the master unit recreates the signal from the measured power consumption of all slave units.

10. The method according to claim 9, wherein the master unit unidirectionally transmits the commands to the respective slave unit, and wherein the slave units unidirectionally receive the commands from the master unit.

11. The method according to claim 9, wherein addresses are assigned to all slave units connected to the master unit, wherein the master unit transmits commands to the slave units using addresses assigned to the slave units, and wherein the slave units detect commands targeted at them, and wherein the slave units only process commands targeted at the respective slave unit.

12. The method according to claim 9, wherein the master unit transmits a command to all connected slave units instructing all connected slave units to increase or decrease their respective power consumption by a defined amount, wherein all connected slave units increase or decrease the power consumption of their respective slave unit as instructed, and wherein the master unit determines a number of connected slave units from a resulting change in total power consumption of all connected slave units.

13. The method according to claim 9, wherein the slave units are adapted to modulate the power consumption
- using an amplitude-shift keying, especially an on-off keying or a phase-shift keying or a frequency-shift keying, and/or
- using a modulation frequency of: below 10 Hz, below 5 Hz, or below 1 Hz.

14. The method according to claim 9, wherein the master unit
- detects when the slave units are not in operation,
- activates at least one slave unit, after it was detected that the respective at least one slave units is not in operation,
- instructs the at least one slave unit to modulate its power consumption after the at least one slave unit has been activated, and
- deactivates the at least one slave unit after power consumption has been modulated.

* * * * *